US008773704B2

(12) United States Patent (10) Patent No.: US 8,773,704 B2
Kashimoto et al. (45) Date of Patent: Jul. 8, 2014

(54) IMAGE PROCESSING APPARATUS THAT GENERATES HYPERLINK STRUCTURE DATA

(71) Applicant: Kyocera Document Solutions Inc., Osaka (JP)

(72) Inventors: Yosuke Kashimoto, Osaka (JP); Takashi Murakami, Osaka (JP); Masaaki Aiba, Osaka (JP); Ryosuke Ogishi, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/030,407

(22) Filed: Sep. 18, 2013

(65) Prior Publication Data

US 2014/0085669 A1  Mar. 27, 2014

(30) Foreign Application Priority Data

Sep. 27, 2012  (JP) .................................. 2012-214138

(51) Int. Cl.
*G06F 15/00* (2006.01)
*G06F 3/12* (2006.01)
*G06K 1/00* (2006.01)
*G06F 3/14* (2006.01)
*H04N 1/40* (2006.01)
*G06K 9/00* (2006.01)

(52) U.S. Cl.
CPC .. *G06F 3/14* (2013.01); *H04N 1/40* (2013.01); *G06K 9/00456* (2013.01)
USPC .......................................... 358/1.15; 358/470

(58) Field of Classification Search
CPC ......... G06F 3/14; G06K 9/00456; H04N 1/40
USPC ................. 358/1.1, 1.15, 1.13, 1.14
See application file for complete search history.

(56) References Cited

U.S. PATENT DOCUMENTS

2010/0082937 A1   4/2010  Sasaki
2011/0252315 A1*  10/2011 Misawa et al. ................ 715/256
2012/0008864 A1*  1/2012  Kanatsu et al. ............... 382/176

FOREIGN PATENT DOCUMENTS

JP       2010-086151       4/2010

* cited by examiner

*Primary Examiner* — Douglas Tran
(74) *Attorney, Agent, or Firm* — McDonnell Boehnen Hulbert & Berghoff LLP (57) ABSTRACT

An image processing apparatus includes an image reading unit configured to read information as image data, a character recognition unit configured to recognize individual characters included in the image data, a grouping unit configured to group the individual characters recognized into one or more character string based on character information indicating a format of the character, a character extraction unit configured to extract a character string for which a link is to be created based on an importance of the character string obtained by the grouping, a character search unit configured to search the image data in which the characters have been recognized for the character string having the same character base among the character strings extracted, and a link setting unit configured to link the character strings having the same character base that are retrieved to each other based on the importance.

19 Claims, 12 Drawing Sheets

```
Table of Contents

1. Glossary

2. Website Creation

.......

.......

P1
```

```
1. Glossary

Hyperlink

"Hyperlink" shows a reference
to link a document.

Free to Link    .......

P2
```

```
2. Website Creation

By using the hyperlink . . .

GROUPING LIST

| PAGE NUMBER | IN-PAGE POSITION | GROUP NUMBER | CHARACTER STRING | CHARACTER INFORMATION | IMPORT -ANCE |
|---|---|---|---|---|---|
| 1 | (x,y) | 0 | TABLE OF CONTENTS | REGULAR 12pts. | 0 |
| 1 | (x,y) | 1 | GLOSSARY | BOLD 11pts. | 2 |
| 1 | (x,y) | 2 | WEBSITE CREATION | BOLD 11pts. | 2 |
| ... | ... | ... | ... | ... | ... |

FIG. 4

IMPORTANT WORD LIST

| CHARACTER STRING |
|---|
| GLOSSARY |
| WEBSITE CREATION |
| ... |

FIG. 5

SEARCH RESULTS LIST

| PAGE NUMBER | IN-PAGE POSITION | GROUP NUMBER | CHARACTER STRING | CHARACTER INFORMATION | IMPORT-ANCE |
|---|---|---|---|---|---|
| 1 | (x,y) | 1 | GLOSSARY | BOLD, 11pts. | 2 |
| 1 | (x,y) | 2 | WEBSITE CREATION | BOLD, 11pts. | 2 |
| 2 | (x,y) | 1 | GLOSSARY | BOLD, 14pts. | 4 |
| 2 | (x,y) | 3 | HYPERLINK | BOLD, 11pts. | 2 |
| 2 | (x,y) | 4 | FREE TO LINK | BOLD, 11pts. | 2 |
| 3 | (x,y) | 2 | WEBSITE CREATION | BOLD, 14pts. | 4 |
| 3 | (x,y) | 3 | HYPERLINK | REGULAR, 14pts. | 1 |

SEARCH RESULTS LIST

| PAGE NUMBER | IN-PAGE POSITION | GROUP NUMBER | CHARACTER STRING | CHARACTER INFORMATION | IMPORT-ANCE | LINK LIMITATION |
|---|---|---|---|---|---|---|
| 1 | (x,y) | 1 | GLOSSARY | BOLD, 11pts. | 4 | UNLIMITED |
| 1 | (x,y) | 2 | WEBSITE CREATION | BOLD, 11pts. | 2 | UNLIMITED |
| 2 | (x,y) | 1 | GLOSSARY | BOLD, 14pts. | 3 | UNLIMITED |
| 2 | (x,y) | 3 | HYPERLINK | BOLD, 11pts. | 2 | UNLIMITED |
| 2 | (x,y) | 4 | FREE TO LINK | BOLD, 11pts. | 2 | UNLIMITED |
| 3 | (x,y) | 2 | WEBSITE CREATION | BOLD, 14pts. | 4 | UNLIMITED |
| 3 | (x,y) | 3 | HYPERLINK | REGULAR, 14pts. | 1 | LIMITED |

IMAGE PROCESSING APPARATUS THAT GENERATES HYPERLINK STRUCTURE DATA

REFERENCE TO RELATED APPLICATIONS

This application is based upon and claims the benefit of priority from the corresponding Japanese Patent Application No. 2012-214138, filed in the Japan Patent Office on Sep. 27, 2012, the entire contents of which are incorporated herein by reference.

BACKGROUND

I. Technical Field

The present disclosure relates to an image processing apparatus that generates hyperlink structure data from image data read by a scanner.

Unless otherwise indicated herein, the description in this background section is not prior art to the claims in this application and is not admitted to be prior art by inclusion in this section.

II. Description of the Related Art

One method of generating hyperlink structure data involves generating a hyperlink based on data in a table of contents and an index page. A page number to which reference is made by a term mentioned in the table of contents or the index page and a page number of a normal page in which the term is mentioned are linked to each other. A user who views image data is allowed to move a page directly from the table of contents and the index page to the normal page to which the reference is made.

However, in the above-described technology, only the page numbers shown in the table of contents (index page) and the normal page are linked to each other. Therefore, it is not possible to create a link to a term that is not mentioned in the table of contents or the index page, an arbitrary term selected by the user, or other such term.

SUMMARY

An image processing apparatus according to one embodiment of the present disclosure includes an image reading unit, a character recognition unit, a grouping unit, a character extraction unit, a character search unit, and a link setting unit. The image reading unit is configured to read information as image data. The character recognition unit is configured to recognize individual characters included in the image data. The grouping unit is configured to group the individual characters recognized by the character recognition unit into one or more character string based on character information indicating a format of the character. The character extraction unit is configured to extract a character string for which a link is to be created based on an importance of the character string obtained by the grouping. The character search unit is configured to search the image data in which the characters have been recognized for the character string having the same character base among the character strings extracted by the character extraction unit. The link setting unit is configured to link the character strings having the same character base that are retrieved by the character search unit, to each other based on the importance.

A non-transitory computer-readable recording medium according to one embodiment of the present disclosure has stored thereon an image processing program that is executable by a computer of an image processing apparatus. The image processing program includes first to sixth program codes. The first program code causes the computer to read information as image data. The second program code causes the computer to recognize individual characters included in the image data. The third program code causes the computer to group the recognized individual characters into one or more character string based on character information indicating a format of the character. The fourth program code causes the computer to extract a character string for which a link is to be created based on an importance of the character string obtained by the grouping. The fifth program code causes the computer to search the image data in which the characters have been recognized for the character string having the same character base among the extracted character strings. The sixth program code causes the computer to link the retrieved character strings to each other based on the importance.

An image processing method according to one embodiment of the present disclosure is performed on an image processing apparatus. An image reading unit reads information as image data. A character recognition unit recognizes individual characters included in the image data. A grouping unit groups the individual characters recognized by the character recognition unit into one or more character string based on character information indicating a format of the character. A character extraction unit extracts a character string for which a link is to be created based on an importance of the character string obtained by the grouping. A character search unit searches the image data in which the characters have been recognized for the character string having the same character base among the character strings extracted by the character extraction unit. A link setting unit links the character strings having the same character base that are retrieved by the character search unit, to each other based on the importance.

Additional features and advantages are described herein, and will be apparent from the following detailed description and the figures.

DETAILED DESCRIPTION

An image processing apparatus and an image processing program according to embodiments of the present disclosure are described. First, a basic configuration of the image processing apparatus is described below.

I. First Embodiment

Figure 1:
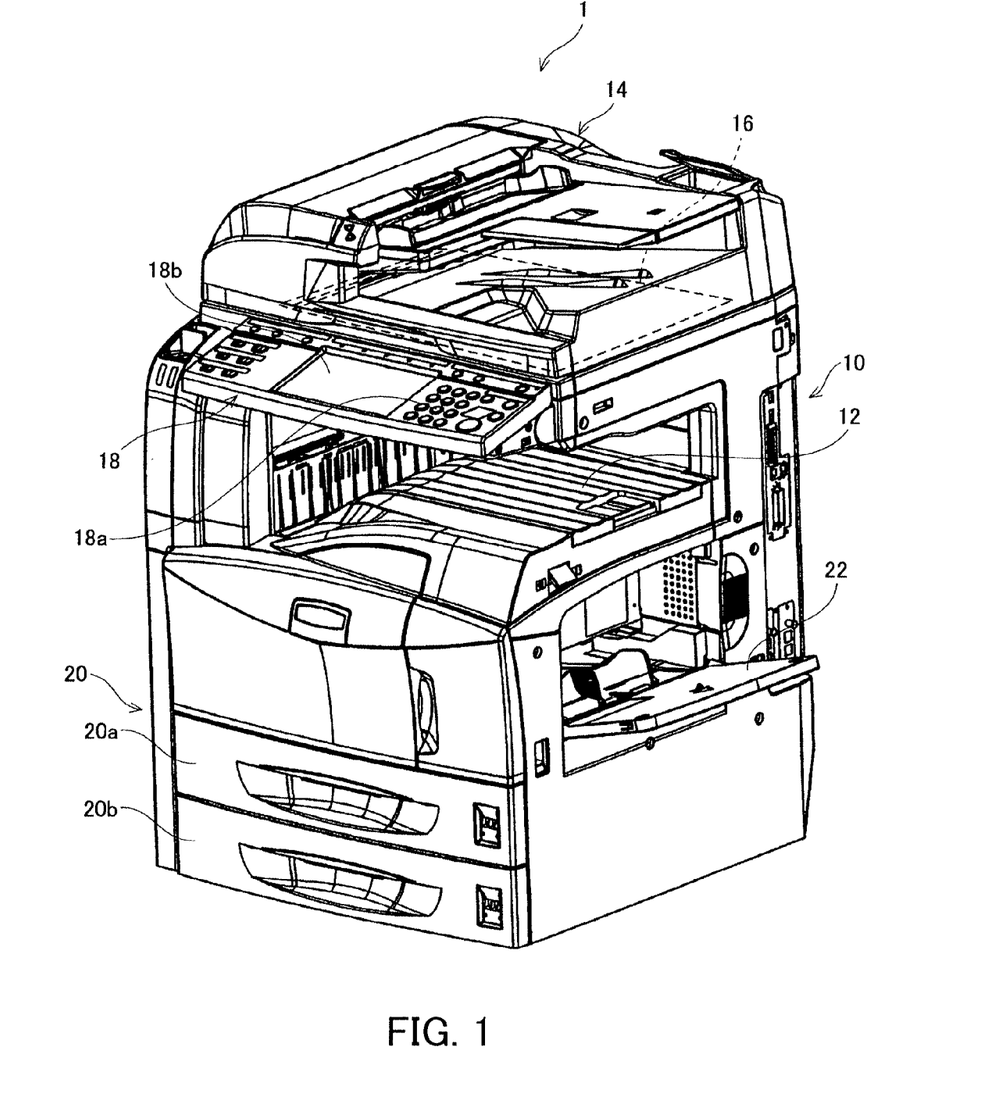
FIG. 1 illustrates a configuration of an image processing apparatus according to an embodiment of the present disclosure.

FIG. 1 illustrates a configuration of an image processing apparatus 1 according to a first embodiment of the present disclosure. FIG. 1 illustrates the image processing apparatus 1 viewed from the front right above, and a front surface of the image processing apparatus 1 to which a user is opposed and a right side surface of the image processing apparatus 1 are visible.

The image processing apparatus 1 is, for example, a digital multifunction peripheral. The image processing apparatus 1 includes an apparatus main body 10 of an in-body delivery type. A delivery tray 12 is formed in a central portion of the apparatus main body 10.

An original feeder 14 is mounted on an upper side of the apparatus main body 10. When the image processing apparatus 1 is used as a copier, a facsimile machine, or a network scanner, an original document is transported from the original feeder 14, and an image surface thereof is optically read by an optical scanner unit (image reading unit) 16.

An operation panel 18 is placed on a front side of the scanner unit 16. The operation panel 18 includes an operation unit 18a including a plurality of operation keys used for various operations of the user, and a display unit 18b including a display screen that displays various kinds of information.

In a lower portion of the apparatus main body 10, a sheet feeder 20 of a front loading type is disposed. In particular, two-stage sheet feeding cassettes 20a and 20b are provided vertically along a height direction of the apparatus main body 10, and each of the sheet feeding cassettes 20a and 20b is attachable to the apparatus main body 10. A retractable manual feed tray 22 is also provided on a right side surface of the apparatus main body 10.

The image processing apparatus 1 according to this embodiment has an optical character reader (OCR) function, and can recognize characters from an image read by the scanner unit 16.

Figure 2:
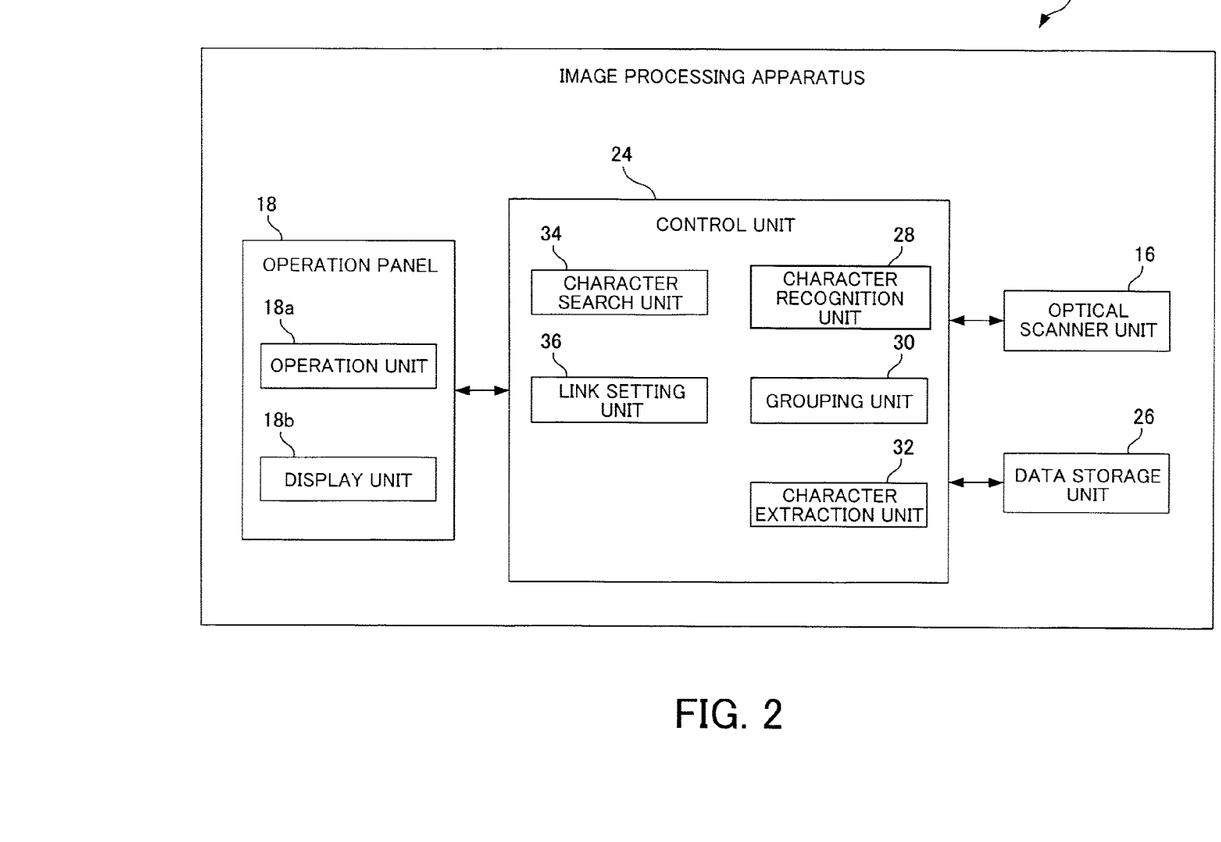
FIG. 2 illustrates a functional configuration of the image processing apparatus according to the embodiment of the present disclosure.

FIG. 2 illustrates a functional configuration of the image processing apparatus 1. With reference to FIG. 2, a description is made mainly of components for realizing image processing by using the OCR function.

The image processing apparatus 1 includes as components the scanner unit 16, the operation panel (operation/display unit) 18, a control unit 24, and a data storage unit 26. The control unit 24 includes a character recognition unit 28, a grouping unit 30, a character extraction unit 32, a character search unit 34, and a link setting unit 36.

The control unit 24 is a component that operates as a computer, and includes hardware resources such as a central processing unit (CPU) and a read-only memory (ROM). The control unit 24 uses the hardware resources to execute a program. The control unit 24 also controls the scanner unit 16, the operation panel 18, the character recognition unit 28, the grouping unit 30, the character extraction unit 32, the character search unit 34, the link setting unit 36, and the data storage unit 26 that are described above.

The character recognition unit 28 recognizes characters included in image data read by the scanner unit 16. Processing for recognizing the characters is performed in accordance with, for example, a procedure for character recognition using the OCR function described above.

The grouping unit 30 groups the individual characters recognized by the character recognition unit 28 into each character string based on character information indicating a format of the character. The character string obtained by the grouping is, for example, a word or a phrase, and has a specific meaning depending on a combination of characters. The character information represents, for example, a font type, a font size, a character color, a marker setting, a boldface type, an italic type, an underline, and a space.

The character extraction unit 32 extracts the character string for which a link is to be created based on an importance of the character string obtained by the grouping. The importance is determined based on, for example, the font size, the character color, the marker setting, the boldface, the italic type, the underline, an indent, a paragraph number, and the like of the character string.

The character search unit 34 searches the image data in which the characters have been recognized for the character string having the same character base among the character strings extracted by the character extraction unit 32.

The link setting unit 36 links the character strings retrieved by the character search unit 34 to each other based on the importance. Specifically, the character string whose importance given to each character string is the greater of the character strings retrieved by the character search unit 34 is set as a link destination.

The data storage unit 26 stores information relating to the character recognized by the character recognition unit 28 within the image data, information relating to the character string obtained by the grouping performed by the grouping unit 30, information relating to the character string extracted by the character extraction unit 32, and results of a search for the character strings performed by the character search unit 34.

The operation panel (operation/display unit) 18 is formed of the operation unit 18a and the display unit 18b described above. In this embodiment, the display unit 18b displays setting information for linking the character strings to each other. The display unit 18b displays an image for updating a list of the character strings extracted by the character extraction unit 32 as the setting information. Alternatively, the display unit 18b displays an image for designating the link destination of the character string retrieved by the character search unit 34.

The operation unit 18a receives the operation of the user performed for the setting information displayed on the display unit 18b. The user directly operates the operation unit 18a, which may be not only the above-mentioned operation keys, but also an operation area on a touch panel or the like.

Figure 3:
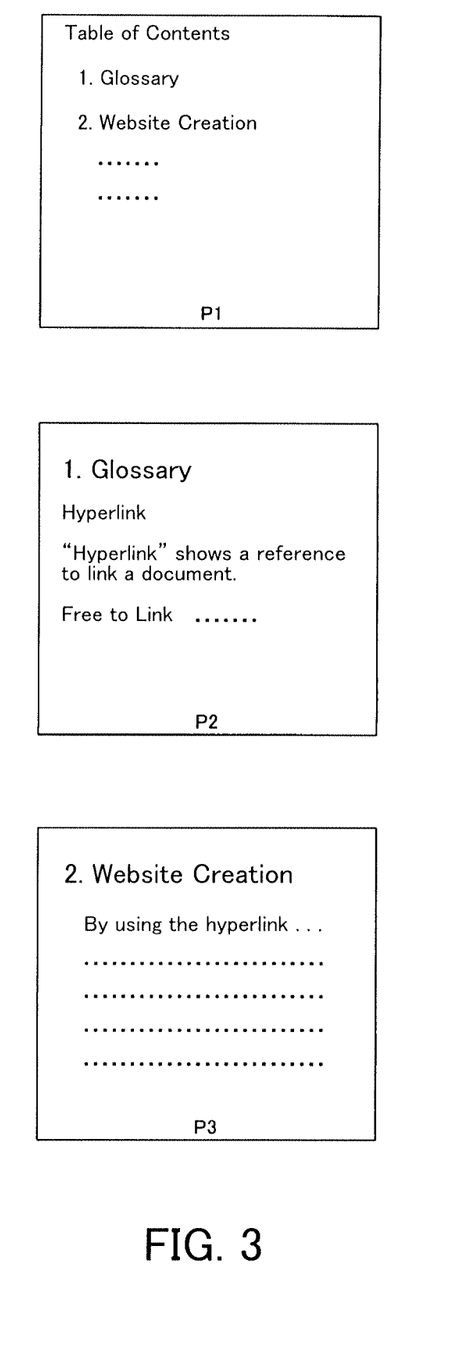
FIG. 3 illustrates an example of image data read by a scanner unit.

FIG. 3 illustrates an example of the image data read by the scanner unit 16 and shows images corresponding to three pages as an example of the image data read by the scanner unit 16. In the image data, words such as "Glossary", "Website Creation", and "Hyperlink" are each shown on a plurality of pages. The words shown in FIG. 3 each differ in the character information such as a character size or a font between the pages.

The character recognition unit 28 recognizes the individual characters shown in the image data. The method for recognizing the characters performed by the character recognition unit 28 is performed in accordance with, for example, a procedure (OCR processing) for recognizing the characters based on the OCR function.

The method for recognizing the characters performed by the character recognition unit 28 is performed in accordance with, for example, the following procedural steps.

(i) A layout of an image is analyzed for each page, and the image is divided into a text area, an image area, and a frame border area.

(ii) The image is analyzed for each of the areas, and analyzed information is stored in the data storage unit 26.

(iii) The text area is broken down horizontally, vertically, and diagonally.

(iv) A character is extracted by counting pixels for each horizontal line and each vertical line obtained by the breakdown.

(v) A size of the extracted character, the character base, a batter or blur of the character, and the like are identified, and then processing, such as normalization, feature extraction, matching, and, character recognition, is performed.

In this manner, the character recognition unit 28 can recognize the individual characters included in the text area in accordance with the above-mentioned procedural steps (i) to (v).

Figure 4:
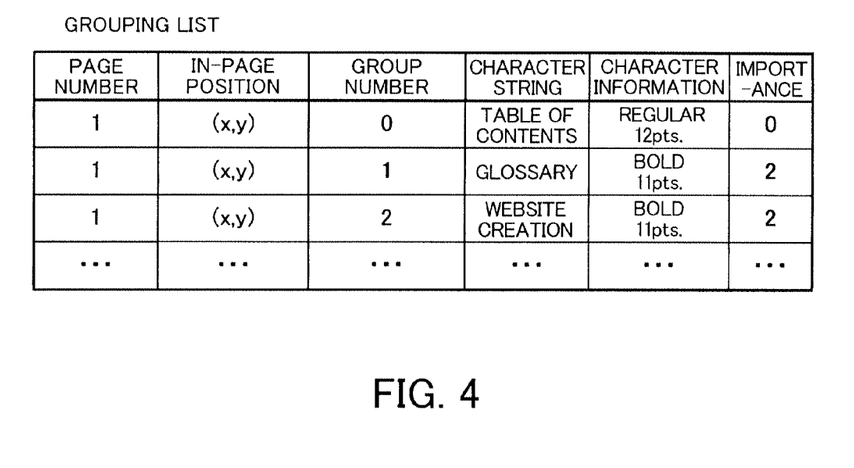
FIG. 4 shows a list of character strings obtained by grouping.

FIG. 4 shows a list of the character strings obtained by the grouping performed by the grouping unit 30. In particular, FIG. 4 shows the character strings included in the image data on the first page (P1) illustrated in FIG. 3.

The individual characters recognized by the character recognition unit 28 are grouped into each character string by the grouping unit 30. This grouping is performed based on the character information indicating the format of the character. Specifically, the grouping unit 30 groups a sequence of characters included in the image data into one character string with reference to the character information indicating the format of the character such as the font type, the font style, the font size, the character color, the marker setting, the boldface, the italic type, the underline, and the space.

In the image data illustrated in FIG. 3, the three words "Table", "of", and "Contents" are shown in the first line from the top of the first page (P1). If those characters have all pieces of the character information in common, the grouping unit 30 groups the sequence of those characters "Table", "of", and "Contents" into one character string.

The character string obtained by the grouping is stored in the data storage unit 26. Further, information relating to the character string is stored in the data storage unit 26. The data storage unit 26 registers the character string and the information relating thereto in, for example, a "grouping list" shown in FIG. 4, to thereby store those pieces of information.

Related information, such as a "page number", an "in-page position", a "group number", "character information", and an "importance", is registered in the grouping list in association with the character string.

The font style (bold, italic, and regular) and the font size (point) are shown in a "character information" field within FIG. 4 as the character information. In addition to combinations thereof, the character information can be formed by combining the font type (such as Gothic or Mincho), the character color, the marker setting, the boldface, the italic type, the underline, the space, and the like in various patterns.

Further, a numeral is shown in an "importance" field within FIG. 4 as a value indicating the importance of the character string for each group. The importance is determined based on, for example, the font size, the character color, the marker, setting, the boldface, the italic type, the underline, the indent, the paragraph number, and the like of each character string.

The importance shown in FIG. 4 indicates that the importance of the character string increases as the value increases. The character extraction unit 32 uses the importance shown in FIG. 4 to extract the character string for which a link is to be created as an important word based on the importance of the character string.

Figure 5:
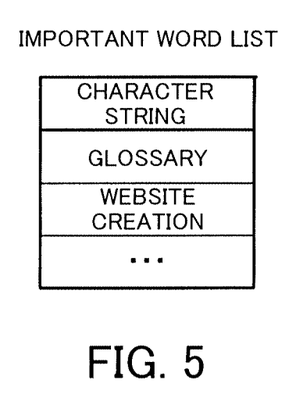
FIG. 5 shows an important word list.

FIG. 5 shows an important word list. The important word list includes character strings extracted by the character extraction unit 32 from among the character strings obtained by the grouping. The character string extracted by the character extraction unit 32 is hereinafter appropriately referred to as "important word".

The character extraction unit 32 determines whether or not to extract the character string based on the importance of the character string shown in FIG. 4. For example, the character extraction unit 32 extracts each of the character strings "Glossary" and "Website Creation" corresponding to the importance "2" shown in FIG. 4 as the important word. On the other hand, the character string "Table of Contents" shown with the importance "0" is not extracted as the important word. The character string extracted by the character extraction unit 32 is stored in the data storage unit 26.

Figure 6:
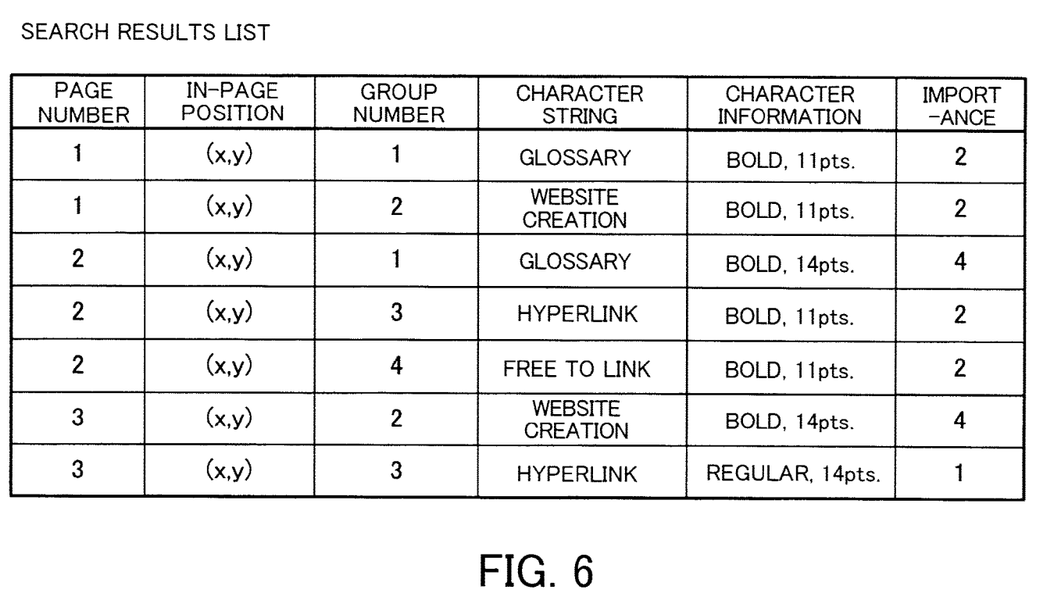
FIG. 6 shows character strings retrieved by a character search unit.
Figure 7:
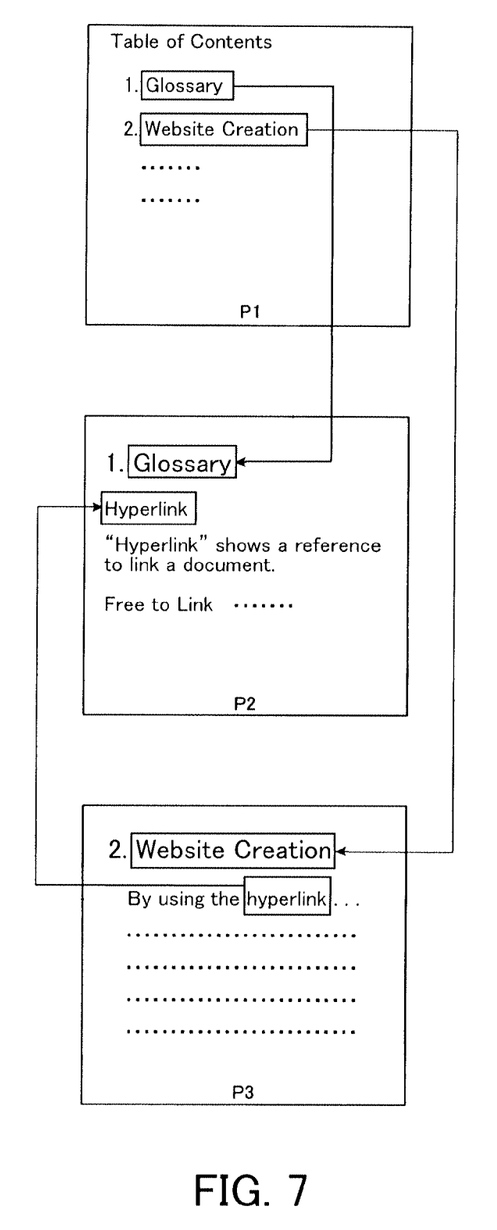
FIG. 7 illustrates how the character strings included in the image data are linked to each other.

FIG. 6 shows character strings retrieved by the character search unit 34. Further, FIG. 7 illustrates how the character strings included in the image data are linked to each other by the link setting unit 36. Note that, FIG. 6 shows search results for the important words included in the image data corresponding to the three pages shown in FIG. 3. Further, the arrows illustrated in FIG. 7 each indicate the link destination of the character string.

The character search unit 34 searches the image data in which the characters have been recognized for the character string having the same character base among the important words extracted by the character extraction unit 32. Herein, the "character base" represents a skeleton of a character, and the character string having the same character base can be expressed in various formats (such as font type, font style, font size, character color, marker setting, boldface, italic type, underline, blank, and character spacing). For example, the character search unit 34 searches the image data corresponding to the three pages shown in FIG. 3 for "Glossary" included in the important word list of FIG. 5.

In the above-mentioned example, through the search performed by the character search unit 34, the character strings that are identified as having the same character base as that of the extracted important word "Glossary" are included in the first page (P1) and the second page (P2). The character search unit 34 stores the search results in the data storage unit 26.

The data storage unit 26 uses, for example, a "search results list" shown in FIG. 6 to manage the above-mentioned search results, and registers the retrieved character string included in each page and the information relating thereto in the search results list in association with each other.

The related information, such as the "page number", the "in-page position", the "group number", the "character information", and the "importance", is registered in the search result list in association with the character string.

The link setting unit 36 refers to the results of the search performed by the character search unit 34 to link the retrieved character strings to each other based on the importance. For example, the link setting unit 36 links a character string "Glossary" included in the first page and the second page of the image data among the important words shown in FIG. 6 to each other. Further, the link setting unit 36 links the two character strings "Website Creation" included in the first page and the third page to each other. Further, the link setting unit 36 links a character string "Hyperlink" included in the second page and the third page of the image data to each other.

Further, with regard to links for the character strings included in the respective pages, the link setting unit 36 sets, as the link destination, the character string whose importance given to each character string is the greater of the character strings having the same character base retrieved by the character search unit 34. For example, the values of the importance of the character string "Glossary" included in the first page and the second page are "2" and "4", respectively, and the importance of the character string included in the second page is greater than the importance of the character string included in the first page. The link setting unit 36 then sets the character string having a greater importance, in other words, "Glossary" included in the second page as the link destination of "Glossary" included in the first page.

Further, the link setting unit 36 also sets the link destinations for the character strings "Website Creation" and "Hyperlink" that are registered in the search result list based on the importance in the same manner as "Glossary". Note that, no link is set for "Free to Link" shown in FIG. 6 because no link destination exists.

By thus linking the important words included in the respective pages to each other, for example, it is possible to allow the user to refer to the important word at the link destination only by clicking on the important word when the image data is displayed on the display unit 18*b* of the operation panel 18, a display of a PC (not shown) connected to the image processing apparatus 1, or the like.

According to the image processing apparatus 1 according to the first embodiment, the character strings included in the image data are linked to each other. Therefore, the character strings mentioned in respective pages can be linked to each other without being limited to the word or phrase mentioned only in a table of contents or an index page. Further, the character string for which a link is to be created is extracted based on the importance, and hence it is possible to prevent a link from being set for an unnecessary character string.

Described so far are the basic and functional configuration of the image processing apparatus 1 according to the first embodiment. In addition, in this embodiment, the above-mentioned image processing apparatus 1 can be operated by causing the computer (control unit 24) to execute the program installed in the image processing apparatus 1. Further, the following description clarifies an example of a procedure for causing the computer of the image processing apparatus 1 to execute the program.

Figure 8:
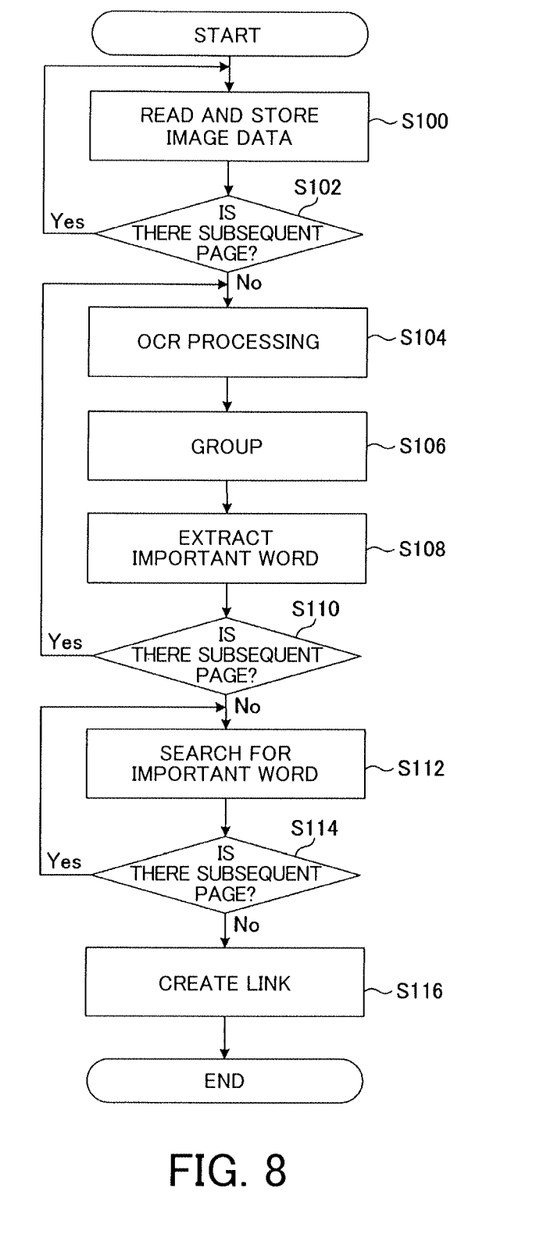
FIG. 8 illustrates a procedure for causing an image processing apparatus according to a first embodiment of the present disclosure to link the character strings included in the image data to each other.

FIG. 8 illustrates a procedure for causing the image processing apparatus 1 according to the first embodiment to link the character strings included in the image data to each other. The procedure is described below step by step.

Step S100: The scanner unit 16 reads the image surface (information) of the original document placed on the original feeder 14 as the image data. The read image data is stored in the data storage unit 26.

Step S102: The control unit 24 determines whether or not the subsequent page of the original document is placed on the original feeder 14. If the subsequent page of the original document is placed on the original feeder 14 (Yes), the procedural step of Step S100 is executed again. Those procedural steps are repeatedly performed until all of the pages of the original document have been read.

Step S104: If no pages of the original document remain on the original feeder 14 ("No" in Step S102), in other words, when the reading has been completed for the original document of all the pages, the control unit 24 causes the character recognition unit 28 to execute analysis of the read image data. The character recognition unit 28 recognizes the characters included in the image data in accordance with the procedure for the OCR processing.

Step S106: The grouping unit 30 groups the individual characters recognized by the character recognition unit 28 into each character string based on the character information. The character string obtained by the grouping is stored in the data storage unit 26 (as a grouping list).

Step S108: The character extraction unit 32 extracts the character string for which a link is to be created based on the importance of the character string obtained by the grouping. The extracted character string (important word) is stored in the data storage unit 26. The control unit 24 causes the character extraction unit 32 to execute the procedural steps of Steps S104 to S108 for each page of the image data. Those procedural steps are executed until having been completed for all the pages ("Yes" in Step S110).

Step S112: If there is no subsequent page to be subjected to the procedural steps of Steps S104 to S108 ("No" in Step S110), in other words, when the above-mentioned procedural steps have been executed for all the pages, the character search unit 34 searches the image data in which the characters have been recognized for the character string having the same character base, that is the important word, among the character strings extracted by the character extraction unit 32. This procedural step is also performed for each page of the image data and executed for all the pages ("Yes" in Step S114).

Step S116: If there is no subsequent page to be subjected to the procedural step of Step S112 ("No" in Step S114), in other words, when the above-mentioned procedural step has been executed for all the pages, the link setting unit 36 links the character strings retrieved by the character search unit 34 to each other based on the importance. Specifically, the character string whose importance given to each character string is the greater of the character strings retrieved by the character search unit 34 is set as the link destination.

In this manner, according to the image processing apparatus 1 and the image processing program of the first embodiment, the character strings included in the respective pages of the image data are linked to each other instead of linking page numbers to each other. Therefore, not only the word or phrase mentioned in a table of contents or an index, but also the character strings mentioned in various pages can be linked to each other.

Further, the link setting unit 36 sets the character string having a greater importance as the link destination. As a result, the user who views the image data can quickly refer to a portion in which an important word or phrase is written.

II. Second Embodiment

Next, a description is made of an image processing apparatus 1 and an image processing program according to a second embodiment of the present disclosure. In the second embodiment, the extracted important word is changed and the link destination is set in response to the operation of the user. The basic configuration of the image processing apparatus 1 is the same as in the first embodiment, and common members are denoted by the same reference symbols with duplicate descriptions thereof omitted appropriately.

Figure 9:
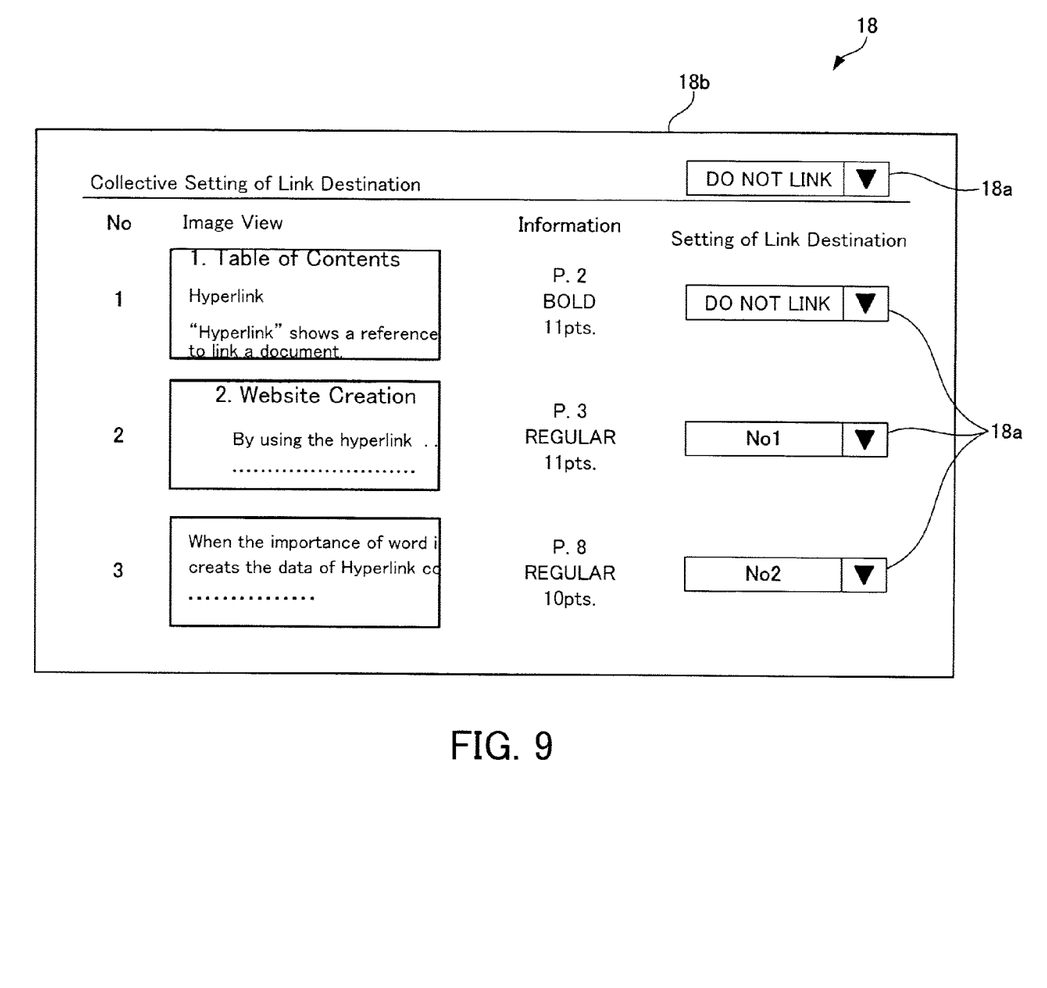
FIG. 9 illustrates an operation panel on which an image for designating a link destination of the character string is displayed.

FIG. 9 illustrates the operation panel 18 on which the image for designating the link destination of the character string is displayed.

Displayed in the display unit 18*b* of the operation panel 18 is the image for designating the link destination of the character string retrieved by the character search unit 34. Three pieces of image data including the retrieved character string "Hyperlink" are displayed in the display unit 18b illustrated in FIG. 9.

Each of the pieces of image data is displayed as an image view in a state in which the character string "Hyperlink" and an area including its surrounding characters are cut out. Further, a numeral is assigned to each of the image views.

Further, the page number and the character information relating to the character string "Hyperlink" included in each of the pieces of image data are displayed next to (on the right of) the image view as "Information". Next to this "Information", link destination information for designating the link destination is displayed in a pull-down format in association with each of the image views. FIG. 9 illustrates, as the link destination information, information such as "No1" and "No2" being the numerals assigned to the respective image views and "Do not link".

The user can operate the pull-down menu to individually designate the link destination of "Hyperlink" displayed in each of the image views. Therefore, the respective pull-down menus illustrated in FIG. 9 correspond to the component serving as the operation unit 18a.

In the pull-down menu corresponding to the image view in the middle (No2) of the three image views arranged vertically on the operation panel 18, "No1" is displayed as the link destination information. This means that the character string included in the image view of "No1" is designated as the link destination of the character string included in the image view of "No2".

The user can also designate the link destination of the character strings included in the image views of "No1" and "No3" in the same manner as the character string included in the above-mentioned image view of "No2". Further, the user may collectively designate the link destinations of the respective character strings.

When the operation of the user is completed, the link setting unit 36 sets the link destinations of the character strings corresponding to the user-selected link destinations.

Described so far is the basic method for designating the link destination according to the second embodiment. Note that, this method has a commonality with the method for extracting the important word in response to the operation of the user. In other words, the image for updating the character string extracted by the character extraction unit 32 is displayed in the display unit 18b of the operation panel 18.

The user can operate the operation panel 18 to update an important word list by deleting the important word displayed on the display unit 18b from the displayed image or newly adding the important word thereto. The updated information is stored in the data storage unit 26. The character search unit 34 refers to the updated information to search for the character string included in the updated important word list stored in the data storage unit 26.

Next, a description is made of an example of a procedure to be executed by the computer of the image processing apparatus 1 according to the second embodiment.

Figure 10:
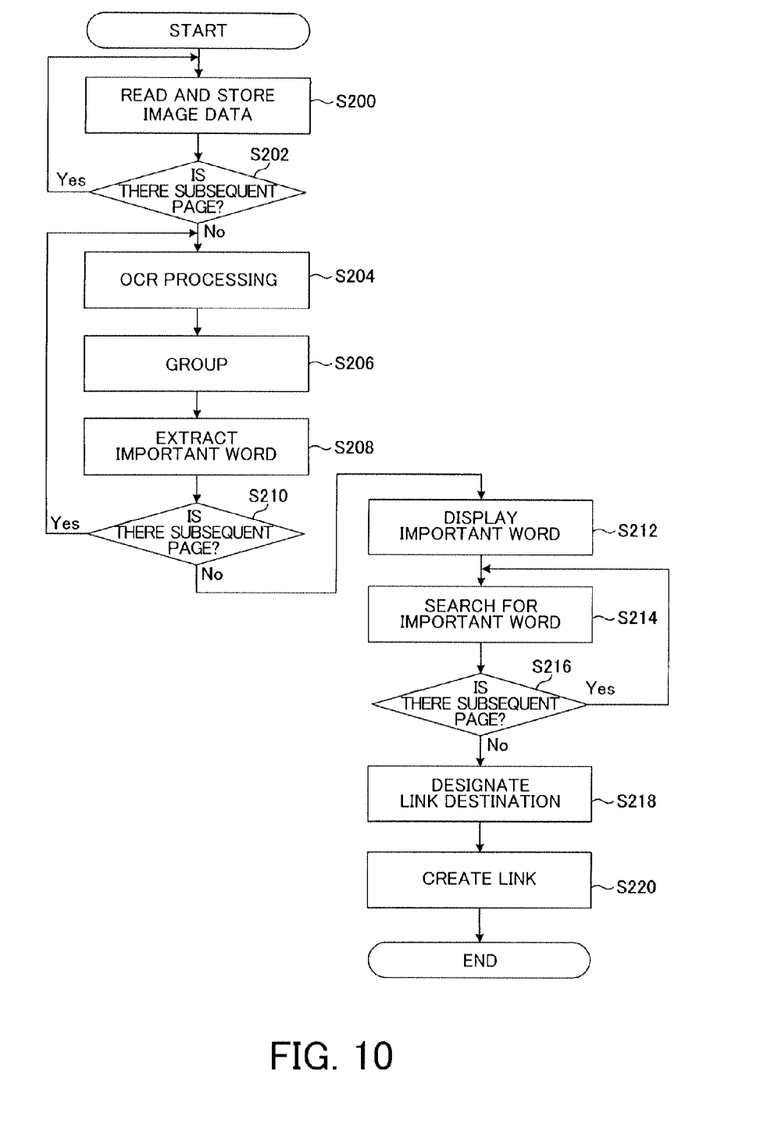
FIG. 10 is a procedure for causing an image processing apparatus according to a second embodiment of the present disclosure to link the character strings included in the image data to each other.

FIG. 10 illustrates a procedure for causing the image processing apparatus 1 according to the second embodiment to link the character strings included in the image data to each other. Steps S200 to S210, S214, S216, and S220 in FIG. 10 are executed in the same way as Steps S100 to S110, S112, S114, and S116 in FIG. 8, respectively. In the following, duplicate descriptions of the procedure illustrated in the flowchart of FIG. 8 are omitted appropriately.

Step S212: When the important word is extracted by the character extraction unit 32, the control unit 24 displays the image for updating the important word list of the extracted character strings in the display unit 18b. This allows the user to update the important word list by operating the operation panel 18. Further, when the operation performed by the user is completed, the updated important word list is stored (updated) in the data storage unit 26.

Step S214: The character search unit 34 searches for the character string included in the important word list updated in response to the operation of the user. The results of the search are stored in the data storage unit 26. This procedural step is also performed for each page of the image data and repeated until the search is completed through all the pages ("Yes" in Step S216).

Step S218: When the character search unit 34 completes the search for the important word through all the pages ("No" in Step S216), the control unit 24 displays the image for designating the link destination of the character string retrieved by the character search unit 34 in the display unit 18b. This allows the user to operate the operation panel 18 to designate the link destination for the important word.

Step S220: When the operation performed by the user is completed, the link setting unit 36 sets the designated character string as the link destination.

According to the image processing apparatus 1 and the image processing program of the second embodiment, the user can delete the automatically-extracted important word or add thereto a word or phrase that is not extracted. Further, the user can freely change the link destination for the important word. Accordingly, the word or phrase determined to be important by the user can also be linked in response to the user's request. Further, the user's request can be reflected while the important word is automatically extracted and the link destination is automatically set, which can improve operability for the user who views the image data.

III. Third Embodiment

Next, a description is made of an image processing apparatus 1 and an image processing program according to a third embodiment of the present disclosure. In the third embodiment, the importance is changed in response to the operation of the user, and the character string for which a link is to be created is limited based on the value of the importance. The basic configuration of the image processing apparatus 1 is the same as in the first embodiment and the second embodiment, and common members are denoted by the same reference symbols with duplicate descriptions thereof omitted appropriately.

Figure 11:
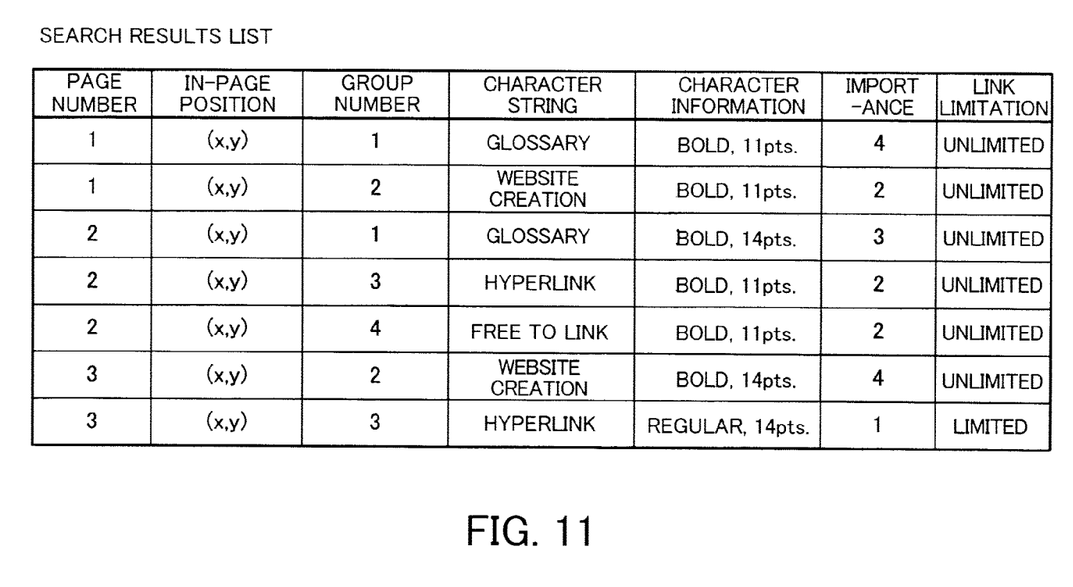
FIG. 11 shows results of a search for the character strings performed by the character search unit after an importance is changed and a limitation is placed on a link in response to an operation of a user.
Figure 12:
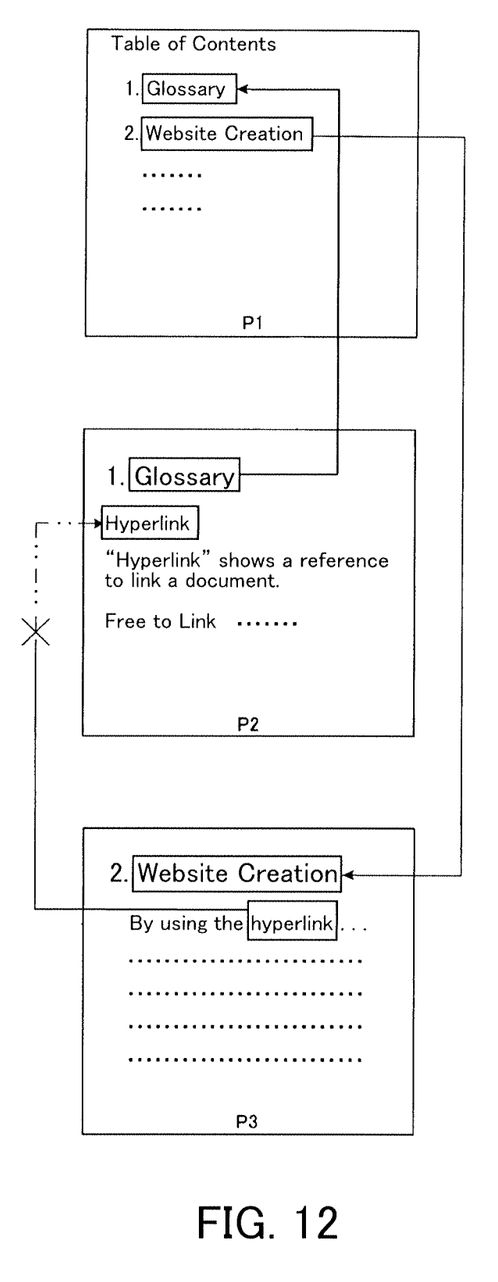
FIG. 12 illustrates how the character strings included in the image data are linked to each other based on the search results shown in FIG. 11.

FIG. 11 shows the results of the search for the character strings performed by the character search unit 34 after the importance is changed and the limitation is placed on the link in response to the operation of the user. Further, FIG. 12 illustrates how the character strings included in the image data are linked to each other by the link setting unit 36 based on the search results shown in FIG. 11.

The user can change the importance of each character string by operating the operation panel 18 on which an image for changing the importance of the character string retrieved by the character search unit 34 is displayed.

For example, the information relating to the search results shown in FIG. 6 and the information relating to the limitation on the link are displayed in the display unit 18b of the operation panel 18. The user can use the information displayed in the display unit 18b to change the importance of each character string. Further, the link setting unit 36 sets the link destination based on the importance changed in response to the operation of the user.

In the search result list shown in FIG. 11, each changed importance is reflected. The importance of "Glossary" in the second line from the top has been changed from "2" to "4". In contrast, the importance of "Glossary" in the fourth line from the top has been changed from "4" to "3". In this case, as illustrated in FIG. 12, the link setting unit 36 sets "Glossary" included in the image data on the first page as the link destination of "Glossary" included in the image data on the second page. In this manner, by changing the importance, the link destination of the character string can be changed in response to the user's request.

Further, in the third embodiment, a limitation is placed on the link based on the importance. The limitation on the link can be set in response to the operation of the user in the same manner as the change of the importance described above, or may be set automatically.

The search result list shown in FIG. 11 is provided with a "link limitation" field, in which "unlimited" shows that the link is not limited for the character string and "limited" shows that the link is limited for the character string.

In the "link limitation" field shown in FIG. 11, "unlimited" is shown for the character string whose importance is equal to or greater than "2" and "limited" is shown for the character string whose importance is less than "2" (in other words, is "1"). In the search result list shown in FIG. 11, the character string "Hyperlink" shown in the first line from the bottom has an importance of "1", and hence the limitation is placed on the link therefor. Therefore, as illustrated in FIG. 12, the character string "Hyperlink" included in the image data on the second page and the third page are not linked to each other.

In the third embodiment, by changing the importance of the character string, the link destination of the character string can be changed. Further, by placing the limitation on the link based on the importance, it is possible to inhibit the number of links for the important word from becoming too large.

The present disclosure is not limited to the above-mentioned embodiments, and various changes can be made to carry out the present disclosure. For example, the image processing apparatus 1 illustrated in the first embodiment to third embodiment is not limited to the multifunction peripheral, and the image processing apparatus 1 may be a scanner, a personal computer, or the like that has the OCR function.

Further, in the second embodiment, from the procedure for linking the character strings included in the image data, the procedural step (Step S212) of displaying the image for updating the list of the important words in the display unit 18b may be omitted, or the procedural step (Step S218) of displaying the image for designating the link destination may be omitted.

According to the embodiments of the present disclosure, the important words used as link destinations are not only extracted from the words or phrases contained in the table of contents or the index, but also from the other pages in the document. Thus, it is possible to efficiently link the important character string out of the character strings included in the image data.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image processing apparatus, comprising:
   an image reading unit configured to read information as image data;
   a character recognition unit configured to recognize individual characters included in the image data;
   a grouping unit configured to group the individual characters recognized by the character recognition unit into one or more character strings based on character information indicating a format of the character;
   a character extraction unit configured to extract a character string for which a link is to be created based on an importance of the character string obtained by the grouping;
   a character search unit configured to search the image data in which the characters have been recognized for the character string having the same character base among the character strings extracted by the character extraction unit; and
   a link setting unit configured to link the character strings having the same character base that are retrieved by the character search unit, to each other based on the importance.

2. The image processing apparatus according to claim 1, wherein the link setting unit is further configured to set, as a link destination, the character string whose importance is greater than the importance of other character strings having the same character base retrieved by the character search unit.

3. The image processing apparatus according to claim 1, further comprising:
   a display unit configured to display setting information for linking the character string; and
   an operation unit configured to receive an operation of a user performed for the setting information displayed in the display unit.

4. The image processing apparatus according to claim 3, wherein:
   the display unit is further configured to display the setting information as an image for updating a list of the character strings extracted by the character extraction unit; and
   the character search unit is further configured to search for the character string included in the list updated in response to the operation of the user.

5. The image processing apparatus according to claim 3, wherein:
   the display unit is further configured to display the setting information as an image for designating a link destination of the character string retrieved by the character search unit; and
   the link setting unit is further configured to set the character string designated in response to the operation of the user as the link destination.

6. The image processing apparatus according to claim 3, wherein:
   the display unit is further configured to display the setting information as an image for changing the importance of the character string; and
   the link setting unit is further configured to set the link based on the importance changed in response to the operation of the user.

7. The image processing apparatus according to claim 1, wherein the link setting unit is further configured to place a limitation on a setting of a link destination for the character string based on the importance.

8. A non-transitory computer-readable recording medium storing an image processing program that is executable by a computer in an image processing apparatus, the image processing program comprising:
   a first program code for causing the computer to read information as image data;
   a second program code for causing the computer to recognize individual characters included in the image data;

a third program code for causing the computer to group the recognized individual characters into one or more character strings based on character information indicating a format of the character;

a fourth program code for causing the computer to extract a character string for which a link is to be created based on an importance of the character string obtained by the grouping;

a fifth program code for causing the computer to search the image data in which the characters have been recognized for the character string having the same character base among the extracted character strings; and a sixth program code for causing the computer to link the retrieved character strings to each other based on the importance.

9. The non-transitory computer-readable recording medium according to claim 8, wherein the sixth program code further causes the computer to set, as a link destination, the character string whose importance is greater than the importance of the retrieved character strings having the same character base.

10. The non-transitory computer-readable recording medium according to claim 9, the image processing program further comprising:

a seventh program code for causing the computer to display setting information for linking the character string in a display unit as an image for updating a list of the character strings extracted by the character extraction unit; and an eighth program code for causing the computer to receive an operation of a user performed for the setting information displayed in the display unit;

wherein the fifth program code further causes the computer to search for the character string included in the list updated in response to the operation of the user.

11. The non-transitory computer-readable recording medium according to claim 9, the image processing program further comprising:

a ninth program code for causing the computer to display setting information for linking the character string in a display unit as an image for updating a list of the character strings extracted by the character extraction unit; and a tenth program code for causing the computer to receive an operation of a user performed for the setting information displayed in the display unit;

wherein the sixth program code further causes the computer to set the character string designated in response to the operation of the user as the link destination.

12. The non-transitory computer-readable recording medium according to claim 9, the image processing program further comprising:

an eleventh program code for causing the computer to display setting information for linking the character string in a display unit as an image for changing the importance of the character string; and a twelfth program code for causing the computer to receive an operation of a user performed for the setting information displayed in the display unit;

wherein the sixth program code further causes the computer to set the link based on the importance changed in response to the operation of the user.

13. The non-transitory computer-readable recording medium according to claim 9, wherein the sixth program code further causes the computer to place a limitation on a setting of the link destination for the character string based on the importance.

14. An image processing method, comprising:

reading, via an image reading unit, information as image data;

recognizing, via a character recognition unit, individual characters included in the image data;

grouping, via a grouping unit, the individual characters recognized by the character recognition unit into one or more character strings based on character information indicating a format of the character;

extracting, via a character extraction unit, the character string for which a link is to be created based on an importance of the character string obtained by the grouping;

searching, via a character search unit, the image data in which the characters have been recognized for the character string having the same character base among the character strings extracted by the character extraction unit; and linking, via a link setting unit, the character strings having the same character base that are retrieved by the character search unit, to each other based on the importance.

15. The image processing method according to claim 14, wherein the link setting unit sets, as a link destination, the character string whose importance is greater than the importance of other character strings having the same character base retrieved by the character search unit.

16. The image processing method according to claim 14, further comprising:

displaying, via a display unit, setting information for linking the character string as an image for updating a list of the character strings extracted by the character extraction unit; and receiving, via an operation unit, an operation of a user performed for the setting information displayed in the display unit, wherein the character search unit searches for the character string included in the list updated in response to the operation of the user.

17. The image processing method according to claim 14, further comprising:

displaying, via a display unit, setting information for linking the character string as an image for designating a link destination of the character string retrieved by the character search unit; and receiving, via an operation unit, an operation of a user performed for the setting information displayed in the display unit, wherein the link setting unit sets the character string designated in response to the operation of the user as the link destination.

18. The image processing method according to claim 14, further comprising:

displaying, via a display unit, setting information for linking the character string as an image for changing the importance of the character string; and receiving, via an operation unit, an operation of a user performed for the setting information displayed in the display unit, wherein the link setting unit sets the link based on the importance changed in response to the operation of the user.

19. The image processing method according to claim 14, wherein the link setting unit places a limitation on a setting of a link destination for the character string based on the importance.

* * * * *